United States Patent
Xie et al.

(10) Patent No.: US 8,652,567 B2
(45) Date of Patent: Feb. 18, 2014

(54) METHOD AND DEVICE FOR PRODUCING CARBON PAPER

(76) Inventors: Zhiyong Xie, Changsha (CN); Qizhong Huang, Changsha (CN); Zhean Su, Changsha (CN); Mingyu Zhang, Changsha (CN); Jianxun Chen, Changsha (CN); Boyun Huang, Changsha (CN)

(*) Notice: Subject to any disclaimer, the term of this patent is extended or adjusted under 35 U.S.C. 154(b) by 0 days.

(21) Appl. No.: 13/474,796

(22) Filed: May 18, 2012

(65) Prior Publication Data

US 2012/0231157 A1 Sep. 13, 2012

Related U.S. Application Data

(63) Continuation-in-part of application No. PCT/CN2010/001859, filed on Nov. 19, 2010.

(30) Foreign Application Priority Data

Nov. 20, 2009 (CN) .......................... 2009 1 0044785

(51) Int. Cl.
*B05D 3/02* (2006.01)

(52) U.S. Cl.
USPC .......................................... 427/113; 427/209

(58) Field of Classification Search
USPC .................................................. 427/113, 209
See application file for complete search history.

(56) References Cited

U.S. PATENT DOCUMENTS

| 7,384,663 | B2 * | 6/2008 | Olry et al. ...................... 427/122 |
| 8,277,872 | B1 * | 10/2012 | Al-Haik et al. ................ 427/112 |
| 2003/0027471 | A1 * | 2/2003 | Shimazaki et al. ............. 442/59 |
| 2003/0161781 | A1 * | 8/2003 | Cabasso et al. ........... 423/445 R |
| 2005/0158468 | A1 * | 7/2005 | Gaffney et al. ............ 427/249.1 |
| 2010/0015493 | A1 * | 1/2010 | Adachi et al. .................. 429/33 |

OTHER PUBLICATIONS

Ra, E.J., et al., "High power supercapacitors using polyacrylonitrile-based carbon nanofiber paper." Carbon, 47 (2009) pp. 2984-2992.*
Yang, Ying, et al., "Polyacrylonitrile-Based Electrospun Carbon Paper for Electrode Applications". Journal of Applied Polymer Science, vol. 124, Issue 5, Nov. 27, 2011, pp. 3861-3870.*

* cited by examiner

*Primary Examiner* — Bret Chen
(74) *Attorney, Agent, or Firm* — Matthias Scholl P.C.; Matthias Scholl

(57) ABSTRACT

A method for producing carbon paper, including: 1) employing a polyacrylonitrile-based carbon fiber as a reinforcing material, a phenolic resin or epoxy resin as a bonding agent, and molding and preparing the carbon fiber into a carbon fiber blank by a dry paper-making method; and 2) stacking and putting a product obtained in step 1) into a reaction furnace for deposition process, the pressure in the reaction furnace being 1 kPa to 1 atmosphere, with methane, propene, or liquefied petroleum gas as a carbon source gas, nitrogen or argon gas as a diluent gas, the concentration of the carbon source gas being 5-100%, the gas flow rate being 0.1-5 L/min, and the temperature in the reaction furnace being controlled at between 800° C. and 1100° C., and the time of deposition process being 1-5 h.

10 Claims, No Drawings

METHOD AND DEVICE FOR PRODUCING CARBON PAPER

CROSS-REFERENCE TO RELATED APPLICATIONS

This application is a continuation-in-part of International Patent Application No. PCT/CN2010/001859 with an international filing date of Nov. 19, 2010, designating the United States, now pending, and further claims priority benefits to Chinese Patent Application No. 200910044785.1 filed Nov. 20, 2009. The contents of all of the aforementioned applications, including any intervening amendments thereto, are incorporated herein by reference.

BACKGROUND OF THE INVENTION

1. Field of the Invention

The invention relates to the field of preparation of carbon paper, and more particularly to a method for producing carbon paper based on a differential-pressure rapid CVI (chemical vapor infiltration) coating, and a device related thereto.

2. Description of the Related Art

Carbon paper is a special functional paper, and the preparation method thereof is same as the traditional paper making process and can be roughly divided into a dry method and a wet method. The wet method is mostly studied at present. Specifically, the following methods are mainly adopted for preparing carbon paper.

(1) Mixing a polyvinyl alcohol (PVA) type solution capable of being used as a bonding agent with chopped carbon fibers, shaping on a paper machine by using the paper-making technology, mutually sticking the chopped carbon fibers after drying, impregnating with dilute solution of phenolic resin and other carbonizable substances, and then preparing a base paper material for carbon-bonded carbon fiber by solidification/carbonization process.

(2) Mixing the dispersion medium with carbonizable short fiber with self-adhesive property, mutually sticking the chopped carbon fibers using the carbonizable short fiber after pulping, carbonizing the carbonizable short fiber in inert atmosphere at the high temperature of 1000° C., and then preparing a carbon-fiber porous material with porosity of 60-90% and resistivity of about 0.1 Ω·cm.

(3) Using the chopped carbon fiber and paper pulp as bonding agent as the raw material, and carrying out paper making and paper forming using the papermaking technology. The paper pulp as bonding agent is removed after being oxidized and gasified in the subsequent hydrophobic treatment process, and meanwhile, lots of uniform pores left on the carbon paper have the function of pore-forming material. The processing method is favorable for reducing the manufacturing cost of carbon paper, and the air permeability can be controlled by controlling the amount of the added paper pulp.

Based on the harsh service environment of carbon paper, carbon paper must have various physical properties such as good mechanical and electrical properties, surface property, durability, and pore size and distribution uniformity. In the traditional carbon paper preparation method, resin is generally adopted as the bonding agent of carbon fiber, the carbon fibers are connected with each other by a hot-press method after drying, and then resin becomes glassy carbon after carbonization and graphitization at the high temperature for enhancing the electrical conductivity of carbon paper, because carbon has better electrical conductivity. However, during the process of carbonization and graphitization, resin will be gradually reduced in volume and decreased in density along with the gradual rise of temperature, thus cracking may be caused between the fiber and matrix carbon, and cracks also may appear inside the matrix carbon. The direct consequence of these problems is that the overall electrical conductivity and mechanical properties of carbon paper are seriously reduced, and its durability is also affected.

SUMMARY OF THE INVENTION

In view of the above-described problems, it is one objective of the invention to provide a method for producing carbon paper based on a differential-pressure rapid CVI (chemical vapor infiltration) coating. The mechanical and electrical properties of carbon paper materials can be remarkably improved by adopting the method.

It is another objective of the invention to provide a device for producing carbon paper based on a differential-pressure rapid CVI (chemical vapor infiltration) coating.

To achieve the above objectives, in accordance with one embodiment of the invention, there is provided a method for producing carbon paper based on differential-pressure rapid CVI (chemical vapor infiltration) coating, comprising:

1) employing a polyacrylonitrile-based carbon fiber as a reinforcing material, a phenolic resin or epoxy resin as a bonding agent, and molding and preparing the carbon fiber into a carbon fiber blank by a dry paper-making method, the thickness of the blank being 100-800 micrometers (e.g., 300 micrometers), and the area density thereof being 20-70 $g/cm^3$ (e.g., 50 $g/cm^3$);

2) stacking and putting a product obtained in step 1) into a reaction furnace for deposition process, the pressure in the reaction furnace being 1 kPa to 1 atmosphere (e.g., 5 kPa), with methane, propene, or liquefied petroleum gas as a carbon source gas, nitrogen or argon gas as a diluent gas, the concentration of the carbon source gas being 5-100% (e.g., 50%), the gas flow rate being 0.1-5 L/min (e.g., 3 L/min), and the temperature in the reaction furnace being controlled at between 800° C. and 1100° C., and the time of deposition process being 1-5 h (e.g., 2 h).

In a class of this embodiment, the method further comprises a process of resin hot pressing after the deposition process, i.e., using phenolic resin as a bonding agent, drying, carbonization, and graphitization of the carbon fiber blank, and then preparing the carbon paper by a traditional hot-press method. The mass fraction of the added phenolic resin is 20-70% of that of the carbon paper.

In a class of this embodiment, the method further comprises a process of resin hot pressing between step 1) and step 2), i.e., using phenolic resin as a bonding agent, drying, carbonization and graphitization of the carbon fiber blank, and then preparing carbon paper by a traditional hot-press method. The mass fraction of the added phenolic resin is 20-70% of that of the carbon paper.

In a class of this embodiment, the time of deposition process in step 2) is modified as 10-100 min (e.g., 50 min), and after the process of resin hot pressing, there is also a process of secondary deposition, that is, the carbon paper obtained during the resin hot pressing process is stacked and put into a reaction furnace, the pressure in the reaction furnace is 1 kPa to 1 atmosphere (e.g., 5 kPa), methane, propene, or liquefied petroleum gas is used as a carbon source gas, nitrogen or argon gas is used as a diluent gas, the concentration of the carbon source gas is 5-100% (e.g., 50%), the gas flow rate is 0.1-5 L/min (e.g., 3 L/min), and the temperature in the reaction furnace is controlled at between 800° C. and 1100° C.; and the time of deposition process is 10-100 min (e.g., 50 min).

In a class of this embodiment, the thickness of a carbon coating obtained in the deposition process is controlled at between 0.1 micrometer and 30 micrometers (e.g., 10 micrometers).

In a class of this embodiment, the ratio between the volume of an empty part in the reaction furnace and the volume of a carbon paper stacking body is 1:9.5-1:5 (e.g., 1:9).

In accordance with another embodiment of the invention, there provided is a device for producing carbon paper based on a differential-pressure rapid CVI (chemical vapor infiltration) coating, comprising a box-shaped reaction furnace. The reaction furnace comprises two flat plate heating elements, a deposition inner container, and an inlet and an outlet for allowing a mixed gas of carbon source gas and diluent gas to enter in and out of the reaction furnace. The two flat plate heating elements are arranged in the reaction furnace and oppositely placed in parallel. The deposition inner container is placed between the two parallel flat plate heating elements, and carbon paper or carbon paper blank is put into the deposition inner container. The inlet and outlet for allowing a mixed gas of carbon source gas and diluent gas to enter in and out are formed at two ends of the reaction furnace, respectively, and the reaction furnace is sealed under the working state.

The heating elements are designed into a plate type, the two flat plate heating elements are oppositely placed in parallel, and the box type deposition inner container is placed between the two parallel heating elements, so as to ensure the uniform temperature distribution in a deposition box. The deposition box is sealed, so as to prevent the carbon source gas from spilling out to be deposited on the heating element; the inner-space size of the deposition box is similar to the carbon paper stacking size, so as to ensure that gas generates greater pressure difference in the flow direction and enable the gas to directly and rapidly flow through the carbon paper stacking body for increasing the deposition rate and deposition uniformity.

A pyrolytic carbon matrix structure (for example, a smooth layer, a rough layer, an isotropic layer, a ribbon structure, etc.) capable of meeting different performance requirements can be deposited through controlling parameters (such as deposition time and deposition temperature). Besides the preparation of the pyrolytic carbon coating, a ceramic coating and a carbon nanotube coating can also be prepared.

The design principle of the invention is as follows:

The invention provides a novel, rapid, and controllable method for chemical vapor deposition/infiltration pyrolytic carbon, and the carbon paper is decorated and modified from the pyrolytic carbon structure, pore structure, fiber bridging, and other microscopic structures, so that the comprehensive performance of enhancing the strength, electrical conductivity and pore distribution uniformity of carbon paper is achieved.

The rapid and uniform surface coating treatment can be carried out to the large-size carbon paper by using the method and the device of the invention, so as to obtain the carbon paper material with high strength, low resistivity and pore distribution uniformity.

The pyrolytic carbon coatings with different structures can be obtained by using the new process, and the mechanical properties, electrical conductivity, and hydrophilicity corresponding to different structures are different, thus the carbon paper material meeting different operating requirements can be prepared.

The deposition method adopts a differential pressure method, and air quickly passes through the carbon paper required to be deposited during the deposition process under the action of pressure difference, so as to enhance the uniformity of the pyrolytic carbon structure and uniformity in deposition thickness; the second characteristic lies in that the box type deposition device is adopted in deposition, the shape similarity between the deposition device and deposition object is favorable for rapid deposition and uniform deposition as well as large-scale production.

Chemical vapor infiltration chemical (CVI) is often called chemical vapor deposition (CVD), the hydrocarbon precursor gas enters inside the porous blank mainly in the way of diffusion, and is cracked on the surfaces around the heated fiber, the formed carbon is deposited on the fiber surface, and the generated hydrogen gas is used as the accessory substance of the CVI process and emitted from the blank after being dispersed through pores. In the CVI process, the pores of the blank are gradually filled with pyrolytic carbon in the form of molecule, the fibers are connected through gas pyrolytic carbon, and the fiber is connected with matrix carbon through gas pyrolytic carbon, so that a network structure is formed inside the material, and the carbon/carbon composite materials are obtained after the completion of process; in the process, the volume of the blank is not reduced, and the pyrolytic carbon is not cracked due to the reduction in volume of the blank; in the process of preparing the carbon/carbon composite materials by a pitch or resin impregnation method, the cracking of the blank is often caused by the reduction in matrix volume in the carbonization process; however, the CVI method can be used first for manufacturing a carbon/carbon composite material framework with a certain strength or density, and then the further densification is carried out by the pitch or resin impregnation method, so that not only the advantages of both the CVI method and the liquid-phase impregnation densification method can be fully performed, but also the defects that the cost is excessive in the CVI method, and the blank is easily cracked in the impregnation method can be overcome.

Because the contraction of matrix pyrolytic carbon can be overcome, the strength and electrical conductivity of the carbon paper material papered or modified by the CVI method are higher than those of the carbon/carbon composite materials prepared by any other process routes.

The relevant process steps of preparing or reinforcing the carbon paper material are as follows:

The first step is the preparation of a carbon fiber blank. The polyacrylonitrile-based carbon fiber is selected as the reinforcing material, and the phenolic resin is selected as the bonding agent. First, the carbon fibers are cut off and distributed between 1 mm and 10 mm to a certain extent; second, the chopped carbon fibers are fully dispersed by an airflow dispersion method under the action of high pressure air; third, the carbon fibers are mutually overlapped together in a layered manner by an air-laid method; finally, the laminar carbon fiber blank is bonded with resin. The area density of the formed carbon fiber blank is controlled between 15 $g/m^2$ and 100 $g/m^2$. It should be noted that the step is not necessary for the invention, and other blank forming methods are also practicable.

The second step is the densification of carbon paper blank. Obviously, the material can reach certain mechanical and electrical properties only when the blank is densified to a certain degree. The way of densification is broadly divided into 3 types: gas-phase densification, solid-phase densification, and liquid-phase densification; the three densification ways above can be used alternately and supplement each other. For example, one way is that the resin or pitch densification method is adopted first, and then the chemical vapor deposition coating is modified for reinforcement after carbonization, and another way is that the fiber blank has a certain extent of strength and density through densification by a chemical vapor deposition method, and then required density and thickness are reached by resin or pitch densification.

The special chemical vapor deposition method is the subject of the invention. The technological parameter affecting the deposition comprises the composition of gas, gas flow, geometric dimension of the furnace body, etc. The isothermal CVI process is adopted for manufacture. In the isothermal method, all blanks are placed in an invariable temperature environment without temperature gradient, and the hydrocarbon gas is diffused and cracked in the pores in the blank, so as to form a series of intermediate products, and finally, the pyrolytic carbon is deposited, and hydrogen gas is removed. The whole technological process is controlled mainly by gas diffusion, and carbon atoms can reach the deposition area at the deep part of the pore only after passing through a long free path, thus it can be generally finished only in the atmosphere of partial vacuum.

The third step is the reinforcement of carbon paper surface coating. The chemical vapor deposition method adopts gas-phase carbonization process, i.e., the process of gas to enter inside the carbon fiber blank to form carbon at the high temperature, gas becomes pervasive due to its small molecular weight, and gas not only can be deposited on the surfaces of fiber and matrix carbon for allowing the fibers to be connected, but also enter the hairline crack to be deposited for filing the crack. The porous network structure is further formed inside the carbon paper, and the fibers are seamlessly connected, so that the electrical conductivity and mechanical properties of carbon fiber are remarkably enhanced.

Advantages of the invention are summarized below: Through the deposition of pyrolytic carbon on the surfaces of fiber and matrix carbon, the bonding between the chopped carbon fibers by bridging is enhanced, and the strength and electrical conductivity of carbon paper are enhanced; according to the relationship between the vapor deposition rate and material pore size, through controlling the thickness of deposition of pyrolytic carbon on the surface of fiber, the pore size and pore-size distribution in carbon paper are accurately controlled, and the flatness and surface characteristics of the material are improved; the performance of high-performance carbon paper ultimately reaches the designed level by accurately controlling the deposited pyrolytic carbon structure. The main results of the method are as follows: the resistivity of all the measured samples is smaller than 30 m$\Omega$·cm, and far lower than that (80 m$\Omega$·cm) of market carbon paper; the resistivity is stable, the resistivity in different directions has small difference, the isotropic ratio is high, and it has no direct relation with volume density; the air permeability at room temperature is equal to or higher than 2,000 mL·mm/(cm$^2$·hr·mmAq); the porosity is 75-78%; the bending strength is equal to or higher than 40 MPa, and the strength difference in different directions is smaller than 10%. The method has the advantages of rapid deposition, controllable structure, density and porosity, uniform distribution of deposited carbon on the surface of carbon fiber, low resistivity, high strength and pore distribution uniformity of the prepared carbon paper material, good isotropic property, low production cost and simple operation. Therefore, the mechanical and electrical properties of the material can be more remarkably enhanced through the method.

DETAILED DESCRIPTION OF THE EMBODIMENTS

Example 1

Blank-Resin Hot Pressing-Deposition-Carbon Paper

A polyacrylonitrile-based carbon fiber is used as a reinforcing material, a phenolic resin or epoxy resin is used as a bonding agent, and the carbon fiber is shaped and prepared into a carbon fiber blank by a wet papermaking method. The blank is 100-800 micrometers in thickness, 20-70 g/cm$^3$ in area density, 1 m in width, and 100 m in length.

The carbon paper blank is cut into corresponding size, the phenolic resin is used as the bonding agent, and the carbon fiber paper is prepared by a traditional hot-press method after drying, carbonization, and graphitization of the carbon fiber blank.

Finally, the carbon paper is stacked and put into a box type differential-pressure deposition furnace to be deposited for 10-100 min at the deposition temperature of 1050° C. Methane, propene, or liquefied petroleum gas is used as carbon source, nitrogen or argon gas is used as diluent gas, and the gas flow is adjusted generally according to the inner-space size and the fed material amount in the furnace body. The carbon paper material prepared in the example has the following performances:

Thickness: 220 micrometers, volume density: 0.41 g/cm$^3$, area density: 90 g/m$^2$, resistivity in the X direction and Y direction: 22.5 m$\Omega$·cm and 17.8 m$\Omega$·cm, and air permeability: 3.15 s.

Example 2

Blank-Deposition-Resin Hot Pressing-Carbon Paper

A polyacrylonitrile-based carbon fiber is used as a reinforcing material, a phenolic resin or epoxy resin is used as a bonding agent, and the carbon fiber is shaped and prepared into a carbon fiber blank by a wet papermaking method. The blank is 100-800 micrometers in thickness, 20-70 g/cm$^3$ in area density, 1 m in width, and 100 m in length.

The carbon paper blank is cut into corresponding size. The carbon paper is stacked and put into a box type differential-pressure deposition furnace to be deposited for 10-100 min at the deposition temperature of 1000° C. Methane, propene, or liquefied petroleum gas is used as carbon source, nitrogen or argon gas is used as diluent gas, and the gas flow is adjusted generally according to the inner-space size and the fed material amount in the furnace body.

Finally, the phenolic resin is used as the bonding agent, the mass fraction of the bonding agent is 40%, and the carbon fiber paper is prepared by a traditional hot-press method after drying, carbonization and graphitization of the carbon fiber blank. The carbon paper material prepared in the example has the following performances:

Thickness: 190 micrometers, volume density: 0.50 g/cm$^3$, area density: 95 g/m$^2$, resistivity in the X direction and Y direction: 21.5 m$\Omega$·cm and 18.9 m$\Omega$·cm, and air permeability: 4.76 s.

Example 3

Blank-Deposition-Carbon Paper

A polyacrylonitrile-based carbon fiber is used as a reinforcing material, a phenolic resin or epoxy resin is used as a bonding agent, and the carbon fiber is shaped and prepared into a carbon fiber blank by a wet papermaking method. The blank is 100-800 micrometers in thickness, 20-70 g/cm$^3$ in area density, 1 m in width and 100 m in length.

Finally, the carbon paper is stacked and put into a box type differential-pressure deposition furnace to be deposited for 1-5 h at the deposition temperature of 950° C., methane, propene, or liquefied petroleum gas is used as carbon source, nitrogen or argon gas is used as diluent gas, and the gas flow is adjusted generally according to the inner-space size and the fed material amount in the furnace body. The carbon paper material prepared in the example has the following performances:

Thickness: 300 micrometers, volume density: 0.56 g/cm³, resistivity in the X direction and Y direction: 19.2 mΩ·cm and 14.8 mΩ·cm, and air permeability: 3.45 s.

Example 4

Blank-Deposition-Resin Hot Pressing-Deposition-Carbon Paper

A polyacrylonitrile-based carbon fiber is used as a reinforcing material, a phenolic resin or epoxy resin is used as a bonding agent, the carbon fiber is shaped and prepared into a carbon fiber blank by a wet papermaking method. The blank is 100-800 micrometers in thickness, 20-70 g/cm³ in area density, 1 m in width and 100 m in length.

The carbon paper blank is cut into corresponding size. The carbon paper is stacked and put into a box type differential-pressure deposition furnace to be deposited for 10-100 min at the deposition temperature of 1100° C., methane, propene or liquefied petroleum gas is used as carbon source, nitrogen or argon gas is used as diluent gas, and the gas flow is adjusted generally according to the inner-space size and the fed material amount in the furnace body.

Thereafter, the phenolic resin is used as the bonding agent, the mass fraction of the bonding agent is 45%, and the carbon fiber paper is prepared by a traditional hot-press method after drying, carbonization and graphitization of the carbon fiber blank.

Finally, the carbon paper is stacked and put into a box type differential-pressure deposition furnace to be deposited for 10-100 min at the deposition temperature of 1100° C., methane, propene, or liquefied petroleum gas is used as carbon source, nitrogen or argon gas is used as diluent gas, and the gas flow is adjusted generally according to the inner-space size and the fed material amount in the furnace body. The carbon paper material prepared in the example has the following performances:

Thickness: 200 micrometers, volume density: 0.45 g/cm³, area density: 85 g/m², resistivity in the X direction and Y direction: 22.5 mΩ·cm and 23.2 mΩ·cm, and air permeability: 2.76 s.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing carbon paper, the method comprising:
   1) employing a polyacrylonitrile-based carbon fiber as a reinforcing material, a phenolic resin or epoxy resin as a bonding agent, molding and preparing the carbon fiber into a carbon fiber blank by a dry paper-making method, a thickness of the blank being 100-800 micrometers, and an area density thereof being 20-70 g/cm³;
   2) a process of resin hot pressing: using the phenolic resin as a bonding agent, drying, carbonizing, and graphitizing the carbon fiber blank, and preparing the carbon paper by a traditional hot-press method, wherein a mass fraction of the phenolic resin to the carbon paper is 20-70%; and
   3) stacking and putting a product obtained in 1) into a reaction furnace for a deposition process, a pressure in the reaction furnace being from 1 kPa to 1 atmosphere, with methane, propene, or liquefied petroleum gas as a carbon source gas, nitrogen or argon gas as a diluent gas, a concentration of the carbon source gas being 5-100%; a gas flow rate being 0.1-5 L/min, a temperature in the reaction furnace being controlled at between 800° C. and 1100° C., and a time of the deposition process being 1-5 h.

2. The method of claim 1, wherein a thickness of a carbon coating obtained in the deposition process is controlled at between 0.1 micrometer and 30 micrometers.

3. The method of claim 2, wherein a ratio between a volume of an empty part in the reaction furnace and a volume of a carbon paper stacking body is 1:9.5-1:5.

4. A method for producing carbon paper, the method comprising:
   1) employing a polyacrylonitrile-based carbon fiber as a reinforcing material, a phenolic resin or epoxy resin as a bonding agent, molding and preparing the carbon fiber into a carbon fiber blank by a dry paper-making method, a thickness of the blank being 100-800 micrometers, and an area density thereof being 20-70 g/cm³;
   2) stacking and putting a product obtained in 1) into a reaction furnace for a deposition process, a pressure in the reaction furnace being from 1 kPa to 1 atmosphere, with methane, propene, or liquefied petroleum gas as a carbon source gas, nitrogen or argon gas as a diluent gas, a concentration of the carbon source gas being 5-100%, a gas flow rate being 0.1-5 L/min, a temperature in the reaction furnace being controlled at between 800° C. and 1100° C., and a time of the deposition process being 10-100 min;
   3) a process of resin hot pressing: using the phenolic resin as a bonding agent, drying, carbonizing, and graphitizing the carbon fiber blank, and preparing the carbon paper by a traditional hot-press method, wherein a mass fraction of the phenolic resin to the carbon paper is 20-70%; and
   4) a process of secondary deposition: the carbon paper obtained during the resin hot pressing process is stacked and put into the reaction furnace, a pressure in the reaction furnace being from 1 kPa to 1 atmosphere, methane, propene, or liquefied petroleum gas being used as a carbon source gas, nitrogen or argon gas being used as a diluent gas, a concentration of the carbon source gas being 5-100%, a gas flow rate being 0.1-5 L/min, and a temperature in the reaction furnace being controlled at between 800° C. and 1100° C., and a time of the secondary deposition process being 10-100 min.

5. The method of claim 4, wherein a thickness of a carbon coating obtained in the deposition process is controlled at between 0.1 micrometer and 30 micrometers.

6. The method of claim 5, wherein a ratio between a volume of an empty part in the reaction furnace and a volume of a carbon paper stacking body is 1:9.5-1:5.

7. A method for producing carbon paper, the method comprising:
   1) employing a polyacrylonitrile-based carbon fiber as a reinforcing material, a phenolic resin or epoxy resin as a bonding agent, molding and preparing the carbon fiber into a carbon fiber blank by a dry paper-making method, a thickness of the blank being 100-800 micrometers, and an area density thereof being 20-70 g/cm³; and
   2) stacking and putting a product obtained in 1) into a reaction furnace for a deposition process, a pressure in the reaction furnace being from 1 kPa to 1 atmosphere, with methane, propene, or liquefied petroleum gas as a carbon source gas, nitrogen or argon gas as a diluent gas, a concentration of the carbon source gas being 5-100%, a gas flow rate being 0.1-5 L/min, a temperature in the reaction furnace being controlled at between 800° C. and 1100° C., and a time of the deposition process being 1-5 h;

wherein a thickness of a carbon coating obtained in the deposition process is controlled at between 0.1 micrometer and 30 micrometers.

8. The method of claim 7, wherein a ratio between a volume of an empty part in the reaction furnace and a volume of a carbon paper stacking body is 1:9.5-1:5.

9. A method for producing carbon paper, the method comprising:

1) employing a polyacrylonitrile-based carbon fiber as a reinforcing material, a phenolic resin or epoxy resin as a bonding agent, molding and preparing the carbon fiber into a carbon fiber blank by a dry paper-making method, a thickness of the blank being 100-800 micrometers, and an area density thereof being 20-70 g/cm$^3$;

2) stacking and putting a product obtained in 1) into a reaction furnace for a deposition process, a pressure in the reaction furnace being from 1 kPa to 1 atmosphere, with methane, propene, or liquefied petroleum gas as a carbon source gas, nitrogen or argon gas as a diluent gas, a concentration of the carbon source gas being 5-100%, a gas flow rate being 0.1-5 L/min, a temperature in the reaction furnace being controlled at between 800° C. and 1100° C., and a time of the deposition process being 1-5 h; and 3) a process of resin hot pressing: using the phenolic resin as a bonding agent, drying, carbonizing, and graphitizing the carbon fiber blank, and preparing the carbon paper by a traditional hot-press method, wherein a mass fraction of the phenolic resin to the carbon paper is 20-70%;

wherein a thickness of a carbon coating obtained in the deposition process is controlled at between 0.1 micrometer and 30 micrometers.

10. The method of claim 9, wherein a ratio between a volume of an empty part in the reaction furnace and a volume of a carbon paper stacking body is 1:9.5-1:5.

* * * * *